US008452048B2

(12) United States Patent
Richardson et al.

(10) Patent No.: US 8,452,048 B2
(45) Date of Patent: May 28, 2013

(54) ASSOCIATING AN OBJECT IN AN IMAGE WITH AN ASSET IN A FINANCIAL APPLICATION

(75) Inventors: Aaron D. Richardson, Dallas, TX (US); Matthew Forbis Brown, McKinney, TX (US)

(73) Assignee: Intuit Inc., Mountain View, CA (US)

( * ) Notice: Subject to any disclaimer, the term of this patent is extended or adjusted under 35 U.S.C. 154(b) by 158 days.

(21) Appl. No.: 13/037,193

(22) Filed: Feb. 28, 2011

(65) Prior Publication Data

US 2012/0219175 A1  Aug. 30, 2012

(51) Int. Cl.
*G06K 9/00* (2006.01)
*H04N 5/225* (2006.01)

(52) U.S. Cl.
USPC .......................................... 382/103; 348/169

(58) Field of Classification Search
USPC .................. 382/103, 107, 236; 348/169, 170, 348/171, 172, 208.1, 208.2, 208.14, 208.16, 348/352; 701/32.4, 412, 468, 470, 471; 342/357.39, 357.72; 386/227
See application file for complete search history.

(56) References Cited

U.S. PATENT DOCUMENTS

| 7,487,114 B2 * | 2/2009 | Florance et al. ............. 705/27.2 |
| 7,761,591 B2 * | 7/2010 | Graham ........................ 709/233 |
| 7,917,286 B2 * | 3/2011 | Taylor et al. .................. 701/468 |
| 8,131,118 B1 * | 3/2012 | Jing et al. ...................... 382/305 |
| 2007/0127848 A1 | 6/2007 | Kim et al. |
| 2009/0005078 A1 | 1/2009 | Dariel |

FOREIGN PATENT DOCUMENTS

JP  2005-202501 A  7/2005

OTHER PUBLICATIONS

Patent Abstracts of Japan, Publication No. 2005-202501A, dated Jul. 28, 2005 (1 page).
International Search Report and Written Opinion dated Feb. 21, 2012, Application No. PCT/US2011/026971 (8 pages).

* cited by examiner

*Primary Examiner* — Abolfazl Tabatabai
(74) *Attorney, Agent, or Firm* — Osha Liang LLP

(57) ABSTRACT

The invention relates to a method for associating an object in an image with an asset of a number of assets in a financial application. The method includes receiving the image of the object comprising global positioning system (GPS) data, where the image is captured using an image-taking device with GPS functionality and processing the image to generate processed GPS data. The method further includes determining, using the processed GPS data, a geographic location of the object in the image, and identifying, using the geographic location, the object by performing a recognition analysis of the image. The method further includes associating, based on the recognition analysis, the object in the image with the asset of the assets of an owner in the financial application, and storing, in the financial application, the image of the object associated with the asset of the assets of the owner.

19 Claims, 6 Drawing Sheets

ASSOCIATING AN OBJECT IN AN IMAGE WITH AN ASSET IN A FINANCIAL APPLICATION

BACKGROUND

Financial software applications typically include functionality to account for one or more assets owned by an owner. Images (e.g., pictures) of an asset may be used to manage financial issues associated with the asset of the owner in a financial application. For example, an insurance agent may use a picture of a car involved in an accident to substantiate the amount of damage the car sustained in the accident. As another example, an accountant may use a picture of a yacht owned by a client, for whom the accountant is performing tax preparation services, so that the condition and value of the yacht may be substantiated. When an image of an object is generated, the image may be manually uploaded and associated with the appropriate asset in the financial application.

SUMMARY

In general, in one aspect, the invention relates to a method for associating an object in an image with an asset of a number of assets in a financial application. The method steps include (1) receiving the image of the object comprising global positioning system (GPS) data, where the image is captured using an image-taking device with GPS functionality, (2) processing, using a computer processor, the image to generate processed GPS data, (3) determining, using the computer processor and the processed GPS data, a geographic location of the object in the image, (4) identifying, using the computer processor and the geographic location, the object by performing a recognition analysis of the image, (5) associating, based on the recognition analysis, the object in the image with the asset of the assets of an owner in the financial application, and (6) storing, in the financial application, the image of the object associated with the asset of the assets of the owner.

In general, in one aspect, the invention relates to a system for associating an object in an image with an asset of a number of assets in a financial application. The system includes a computer processor, a storage repository associated with the financial application, a global positioning system (GPS) data engine, a GPS data reading module, and a GPS mapping module, which are all operatively connected. The GPS data engine executes on the computer processor and is configured to: (1) receive the image of the object comprising GPS data, where the image is captured using an image capture device with GPS functionality, (2) identify, using a geographic location, the object by performing a recognition analysis of the image, (3) associate, based on the recognition analysis, the object in the image with the asset of the assets of an owner in the financial application, and (4) store, in the storage repository, the image of the object associated with the asset of the assets of the owner. The GPS data reading module executes on the computer processor and is configured to process the image with the GPS data to generate a processed GPS data. The GPS mapping module executes on the computer processor and is configured to determine, using the processed GPS data, the geographic location of the object in the image.

In general, in one aspect, the invention relates to a computer readable medium comprising computer readable program code embodied therein for performing a method for associating an object in an image with an asset of a number of assets in a financial application. The method steps include (1) receiving the image of the object comprising global positioning system (GPS) data, where the image is captured using an image-taking device with GPS functionality, (2) processing the image to generate processed GPS data, (3) determining, using the processed GPS data, a geographic location of the object in the image, (4) identifying, using the geographic location, the object by performing a recognition analysis of the image, (5) associating, based on the recognition analysis, the object in the image with the asset of the assets of an owner in the financial application, and (6) storing, in the financial application, the image of the object associated with the asset of the assets of the owner.

Other aspects of the invention will be apparent from the following description and the appended claims.

DETAILED DESCRIPTION

Figure 1:
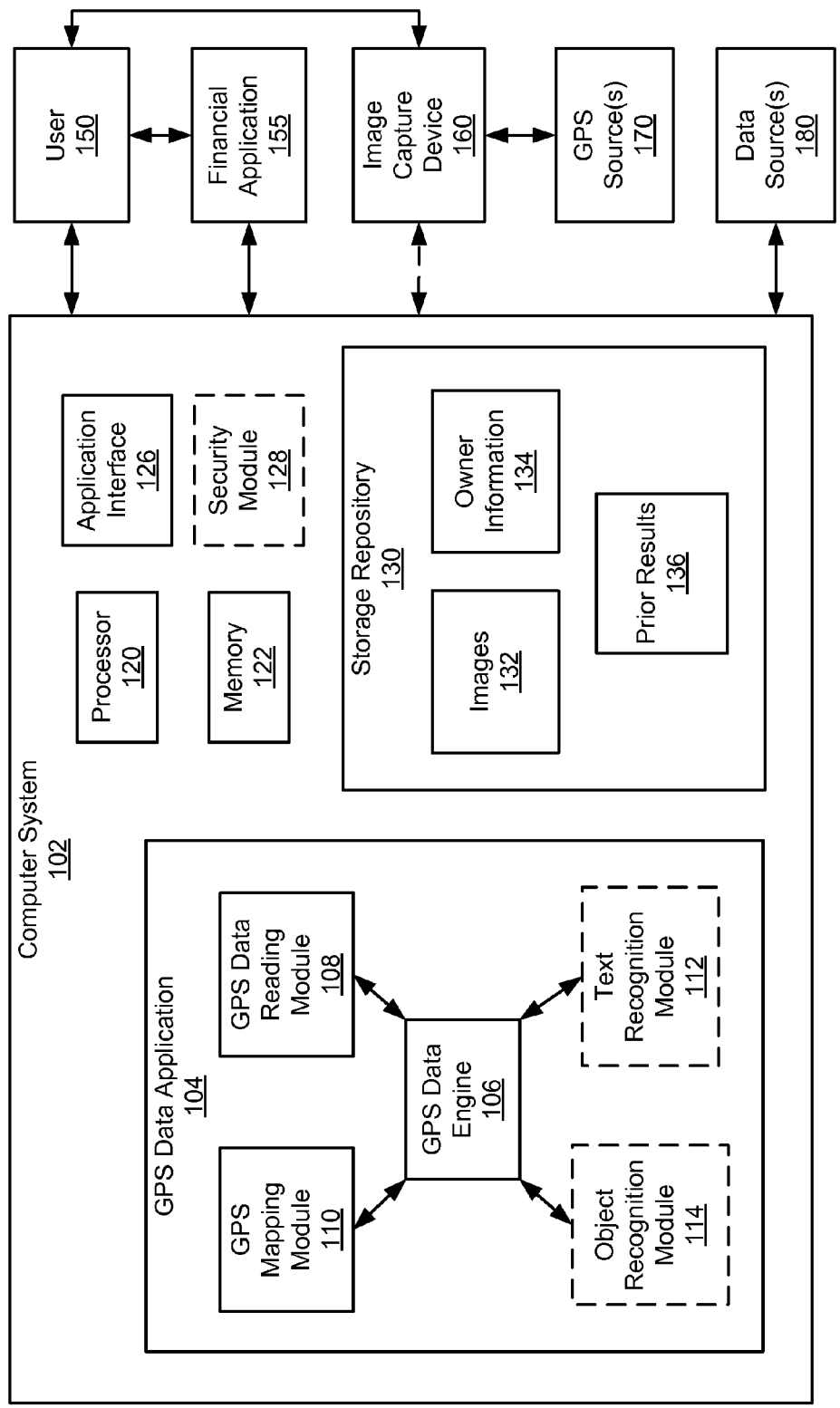
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention associate an object in an image with an asset in a financial application. Specifically, one or more embodiments of the invention process an image to determine a geographic location of an object in the image. The object may then be identified by performing recognition analysis of the image according to embodiments of the invention. The object of the image may then be associated with an asset in the financial application. Thus, one or more embodiments of the invention provide a method and system for automatically associating, using recognition analysis based on global positioning system (GPS) data (e.g., metadata), the object in an image with an asset in a financial application.

In one or more embodiments of the invention, the GPS data is associated with the object in the image using geotagging. Geotagging is a process where GPS data and/or other geographical identification information are associated with and/or embedded in an image. GPS as used herein refers generically to one or more systems that use satellites and similar technology to determine a geographic position. Examples of such a system include, but are not limited to, the Global Positioning System developed by the U.S. Department of Defense, the Russian Global Navigation Satellite System (GLONASS), and the BeiDou Navigation System.

FIG. 1 shows a diagram of a system in accordance with one or more embodiments of the invention. The system includes a computer system (102), a user (150), a financial application (155), an image capture device (160), one or more GPS sources (170), and one or more data sources (180). The computer system (102) includes a GPS data application (104), a storage repository (130), a processor (120), memory (122), an application interface (126), and, optionally, a security module (128). The GPS data application (104) includes a GPS data engine (106), a GPS data reading module (108), a GPS mapping module (110), and, optionally, a text recognition module (112) and an object recognition module (114). The storage repository (130) includes images (132), owner information (134), and prior results (136). Each of these components is described below. Embodiments of the invention are not limited to the configuration shown in FIG. 1 and discussed herein.

In one or more embodiments of the invention, the computer system (102) is implemented according to a client-server topology. The computer system (102) may correspond to enterprise software running on one or more servers, and in some embodiments may be implemented as a peer-to-peer system, or resident upon a single computing system. In addition, the computer system (102) may be accessible from other machines using one or more application programming interfaces and/or user interfaces (not shown). In one or more embodiments of the invention, the computer system (102) may be accessible over a network connection (not shown), such as the Internet, by one or more users (e.g., user, data source, image capture device). Further, information and/or services provided by the computer system (102) may also be stored and accessed over the network connection.

Alternatively or additionally, in one or more embodiments of the invention, the computer system (102) may be a local computer system of the user (150). The computer system (102) may also include the financial application (155), the image capture device (160), and/or a data source (180). In such embodiments, the computer system (102) may, optionally, not be implemented using a client-server topology. For example, the computer system (102) may correspond to a laptop computer, desktop computer, mobile device, or another type of computing device, or combination of multiple computing devices. Additionally or alternatively, the computer system (102) may be a distributed computer system and/or multi-processor computer system in which the computer system includes multiple distinct computing devices.

Continuing with FIG. 1, the user (150) uses one or more financial applications (155) to manage one or more assets owned by an owner. A financial application (155) may be computer software used by a user to process data associated with the one or more assets stored in the financial application (155). The financial application (155) may be used for one of a number of industries and/or purposes, including but not limited to budgeting, creating financial statements, accounting, appraisals, insurance adjustments, tax preparation, and managing a trust and/or estate. An owner may be a person, company, or other entity having ownership and/or title to the one or more assets in the financial application (155). The financial application (155) may execute on a stand-alone system, the user system, or the computer system (102). Further, images sent by the image capture device (160) may be sent directly to a system on which the financial application (155) executes.

The user (150) (or an image capture device (160), described below) submits, to the computer system (102), an image of an object that may be associated with an asset of an owner in the financial application (155) in accordance with one or more embodiments of the invention. An asset may be any item that may have economic value. Examples of an asset may include, but are not limited to, a boat, a house, a car, a set of tools, a race horse, a baseball card or collection of baseball cards, a doll or collection of dolls, a coin collection, a book, an ancient artifact, and clothing. The user (150) may be a merchant, an individual, the owner, an agent, an insurance claims adjuster, a trustee, an administrator of an estate, an accountant, a banker, a broker, a consultant, a representative of the owner, some other entity that uses the financial application (155), etc.

In one or more embodiments of the invention, the user (150) may interact with the computer system (102). Specifically, the user (150) may send information (e.g., an image of the object, a confirmation) to the computer system (102). The user (150) may send information to the computer system (102) in a number of manners (e.g., modes of communication), including but not limited to conventional mail, telephone, email, fax, short message service, over the Internet, some other suitable mode for sending information, or any combination thereof. Further, the user (150) may receive information (e.g., a request for confirmation, a notification that an image is insufficient to identify an object) from the computer system (102). The information sent from the user (150) to the computer system (102) and/or from the computer system (102) to the user (150), may be delivered automatically (e.g., according to a default setting, a user preference, an owner preference, an occurrence of an event) or on demand, for example, in response to a request from the computer system (102). The computer system (102) may interact with the user (150) in the same manner that the user (150) interacts with the computer system (102), or using different modes of communication. The user (150) may use a user system (not shown) (discussed below) to interact with the computer system (102) using software (not shown) in accordance with one or more embodiments of the invention.

In one or more embodiments of the invention, the user (150) interacts with the image capture device (160). Specifically, the user (150) uses the image capture device (160) to capture one or more images of an object. The image capture device (160) may be any device adapted to capture an image of the object. Further, the image capture device (160) may have GPS functionality allowing the image capture device (160) to associate GPS data with the image of the object. Examples of an image capture device (160) may include, but are not limited to, a hand-held still-picture camera (e.g., digital, 35 mm) to take still pictures, a video camera (e.g., digital, 8 mm), a mobile device with image capture capabilities, a laptop computer with an image capture device, and a medical imaging device (e.g., computed axial tomography scanner, a magnetic resonance imaging device, a magnetic particle imaging device, an x-ray machine) The GPS functionality may be a GPS receiver capable of sending a request for GPS data and receiving the GPS data from GPS Source(s) (170).

An image captured by the image capture device (160) may be a representation of an object in two or more dimensions. An object may be an item (e.g., an asset) that is depicted in a captured image, where the object may have one or more features (e.g., shape, height, width, color) that are captured in an image. Further, an image may depict more than one object. In one or more embodiments of the invention, the image is in digital format (e.g., captured with a digital device, scanned into digital format).

If the image capture device (160) does not produce a digital image and/or if the image capture device (160) does not have GPS functionality, then one or more supplemental devices (e.g., scanner, computer combined with a GPS device such that GPS data may be automatically or manually associated with image) may be used to digitize the image and/or associate GPS data with the image. For example, a 35 mm camera may be used to capture the image (in this case, take a picture), after which the image, once developed, is scanned into a digital format. Further, GPS data may be obtained from a hand-held GPS device, which captures the GPS coordinates at the time the image was taken, for associating with the digital image using software.

In one or more embodiments of the invention, the image capture device (160) is capable of capturing, storing, and/or delivering one or more images of an object. The image capture device (160) may send information (e.g., an image, a request for GPS data) to the user (150), one or more GPS sources (170), and/or the computer system (102). The image capture device (160) may also receive information (e.g., a command to capture an image, GPS data associated with an image) from, the user (150), one or more GPS sources (170), and/or the computer system (102). The information may be sent to, and/or delivered by, the image capture device (160) automatically (e.g., according to a default setting, a marketing entity preference, an occurrence of an event) or on demand, as from a request made by the computer system (102). The image capture device (160) may interact with the computer system (102) in the same mode of communication that the computer system (102) interacts with the image capture device (160), or using different modes of communication. In one or more embodiments of the invention, the image capture device (160) uses an image capture device system (not shown) to interact with the computer system (102), the user (150), and/or a GPS source (170) using image capture device software (not shown) (discussed below).

Continuing with FIG. 1, in one or more embodiments of the invention, a GPS source (170) is an entity or system that receives a signal from a GPS receiver (e.g., an image capture device (160) with GPS functionality, a hand-held GPS device) to request GPS data providing a location of the GPS receiver. The GPS source (170) may also send, in response to the request, the GPS data to the GPS receiver. A GPS source (170) may be a satellite or system of satellites, a communication tower or series of communication towers, or some other suitable system capable or providing GPS data. A request for GPS data may be delivered by the image capture device (160) automatically (e.g., according to a default setting, upon the capture of an image, every minute) or on demand, as from a request made by the user (150) operating the digital capture device (160). Each GPS source (170) may interact with the image capture device (160) in the same mode of communication that the image capture device (160) interacts with each GPS source (170), or using different modes of communication, described below. In one or more embodiments of the invention, each GPS source (170) uses a GPS source system (not shown) (discussed below) to interact with the image capture device (160) using GPS source software (not shown) (discussed below).

Continuing with FIG. 1, in one or more embodiments of the invention, a data source (180) is an entity or system retrieves and sends additional information needed by one or more components of the GPS data application (104). The information retrieved by a data source (180) may be based on a request from one or more components of the GPS data application (104). The one or more data sources (180) used to retrieve and send information to a component of the GPS data application (104) may be determined by default (e.g., based on the component of the GPS data application (104) sending the request), by the user (150), or by some other suitable entity or algorithm. As an example, the GPS mapping module (110) (described below) may need additional information to convert the processed GPS data associated with an image to a geographic location (e.g., street address). In embodiments of the invention, a data source (180) may retrieve, upon receiving a request from the GPS mapping module (110), a street address, a business name, some other information needed for the geographic location, or any combination thereof, and send such information to the GPS mapping module (110).

As another example, the text recognition module (112) (described below) may need assistance interpreting a symbol or character found by character recognition software. In embodiments of the invention, a data source (180) may retrieve, upon receiving a request from the text recognition module (112), identified text for the symbol or character and send such identified text to the text recognition module (112).

As a further example, the object recognition module (114) (described below) may need assistance interpreting a partial shape of an object in an image found by the object recognition software used by the object recognition module (114). In embodiments of the invention, a data source (180) may retrieve, upon receiving a request from the object recognition module (114), an identified object (which may include one or more features of the object) for the partial object and send such identified object to the object recognition module (114). Each data source (180) may interact with the computer system (102) in the same mode of communication that the computer system (102) interacts with each data source (180), or using different modes of communication. In one or more embodiments of the invention, each data source (180) uses a data source system (not shown) (discussed below) to interact with the computer system (102) using data source software (not shown) (discussed below).

The GPS data application (104) may also be implemented as a browser extension. In such a scenario, user software, image capture device software, and/or GPS source software may interact directly with the GPS data application (104) as a browser extension.

Continuing with FIG. 1, the computer system (102) is configured to interact with the user (150), the image capture device (160), and/or each data source (180) using an application interface (126) in accordance with one or more embodiments of the invention. Specifically, the application interface (126) of the computer system (102) is configured to receive input from and send output to the user (150), the image capture device (160), and/or each data source (180). The user (150), the image capture device (160), and/or each data source (180) may include an interface to receive data from and send data to the computer system (102). Examples of an interface may include, but are not limited to, a graphical user interface, an application programming interface, a keyboard, a monitor, a mouse, a web service, a data protocol adapter, some other hardware and/or software, or any suitable combination thereof.

In one or more embodiments of the invention, the information received by the application interface (126) includes, but is not limited to, an image, GPS data, and a confirmation. The information sent by the application interface (126) may include, but is not limited to, a request for an image, a request for confirmation, and a notification. The requests and/or notifications sent by the application interface (126) may specify, but are not limited to, a user (150), an image capture device (160), a data source (180), a Uniform Resource Identifier (URI) (e.g., a Uniform Resource Locator (URL), a web address, etc.), an image identified by the GPS data engine (106), some other software or source of information, or any suitable combination thereof.

In one or more embodiments of the invention, the information (i.e., data) transferred among the application interface (126), the user (150), the image capture device (160), a GPS source (170), and/or data source (180) corresponds to metadata associated with, for example, an image, GPS data, user preferences, settings, feedback, and/or requests. In this case, the metadata may describe the data in the image, GPS data, user preferences, settings, feedback, and/or requests (i.e., the metadata may provide a context for the data). In one or more embodiments of the invention, the computer system (102) is configured to support various data formats provided by the user (150), the image capture device (160), and/or each data source (180).

Continuing with FIG. 1, the computer system (102) is configured to retrieve and store images (132), owner information (134), and prior results (136). More specifically, the computer system (102) may be configured to use the GPS data engine (106) to retrieve and store images (132), owner information (134), and prior results (136) in the storage repository (130) in accordance with one or more embodiments of the invention.

In one or more embodiments of the invention, the images (132) of the storage repository (130) may include one or more images of one or more objects associated with one or more assets, owned by the owner, in the financial application (155). Each of the images (132) stored in the storage repository (130) may be associated with other information, including but not limited to GPS data, the asset to which the image is associated, and the date/time that the image was captured. The images (132) stored in the storage repository (130) may be associated with assets in one or more financial applications (155) involving the user (150) or a number of users.

In one or more embodiments of the invention, the owner information (134) includes a list of assets owned by the owner in the financial application (155). The owner information (134) may include other information about the owner, including but not limited to identification information (e.g., name, address, identification number) about the owner, other images that are associated with an asset, and the financial application (155) that includes an asset of the owner.

In one or more embodiments of the invention, the prior results (136) are the results of previous associations of an object in an image. Specifically, an object that is captured in an image on a periodic basis and processed using the financial application (155) may be used to identify an image of the object recently captured and to associate the object with the asset. The prior results (136) stored in the storage repository (130) may be associated with one or more images involving the user (150) or a number of users. For example, each user may have a corresponding set of prior results. Alternatively (or additionally), all users may share the same prior results. In this case, personal information of the users may be hidden or removed from the shared prior results. The prior results (136) may be associated with various information, including but not limited to a particular user, one or more images, and one or more assets.

Continuing with FIG. 1, the storage repository (130) is a persistent storage device (or set of devices) that stores software and data used to associate an object in an image with an asset in a financial application (155). In one or more embodiments of the invention, the storage repository (130) is configured to store the images (132), owner information (134), and prior results (136) in accordance with one or more embodiments of the invention. Examples of a storage repository (130) include, but are not limited to, a database (or a number of databases), a file system, a hard drive, some other form of data storage, or any suitable combination thereof. The storage repository (130) may be located on multiple physical machines, each storing all or a portion of the images (132), owner information (134), and prior results (136). Each storage unit or device may be physically located in the same or different geographic location.

The storage repository (130) may be operatively connected to the GPS data application (104). In one or more embodiments of the invention, the GPS data application (104) includes functionality to associate an object in an image with an asset in a financial application (155). More specifically, the GPS data application (104) may be configured to receive, for example, images, GPS data, user preferences, settings, feedback, and a confirmation from the application interface (126) and store the images, owner information, and prior results in the storage repository (130). The functions of the GPS data application (104) may be performed on a single computing device or on multiple computing devices. When the functions of the GPS data application (104) are performed on multiple computing devices, a number of configurations and/or frameworks may be used. The configurations and/or software frameworks may be designed to work with multiple data nodes and large quantities of data. One or more calculations performed by one or more components of the GPS data application (104) may be performed on multiple machines operating in parallel, where the results from each machine may be combined to generate a result to the one or more calculations.

In one or more embodiments of the invention, the GPS data engine (106) of the GPS data application (104) is configured to coordinate the GPS data reading module (108), the GPS mapping module (110), and, optionally, the text recognition module (112), the object recognition module (114), and the security module (128). Specifically, the GPS data engine (106) may be configured to coordinate the transfer of, for example, images, GPS data, user preferences, settings, feedback, and a confirmation between the application interface (126), the storage repository (130), and the other components of the GPS data application (104).

Further, the GPS data engine (106) may be configured to retrieve images (132), owner information (134), and prior results (136) from, and send images, owner information, and prior results to the storage repository (130) for use by the GPS data engine (106) or by other components of the GPS data application (104). The GPS data engine (106) may also be configured to retrieve images (132), owner information (134), and prior results (136) from the storage repository (130) to be sent to the user (150), the image capture device (160), and/or one or more data sources (180).

Continuing with FIG. 1, the GPS data engine (106) is configured to receive an image of an object. Specifically, the object in the image may be associated with an asset of an owner in a financial application (155). Further, the image may include GPS data. The GPS data engine (106) may receive the image from the user (150) and/or the image capture device (160) through the application interface (126).

In one or more embodiments of the invention, the GPS data engine (106) identifies the object in the image by performing one or more recognition analyses of the image. A recognition analysis may be one or more evaluations, using various data, conducted to identify the object in the image. Each recognition analysis performed by the GPS data engine (106) may use a geographic location, derived from the GPS data of the image and received from the GPS mapping module (110), of the object in the image. A recognition analysis may also include text recognition and/or object recognition. For example, the GPS data engine (106) may perform a recognition analysis, using the geographic location and text recognition software, to identify the object in the image. The GPS data engine (106) may also use images (132) and/or prior results (136) from the storage repository (130), in conjunction with or independently of a recognition analysis, to identify the object in the image. If an image includes more than one object, the recognition analysis performed by the GPS data engine (106) may identify each object in the image.

As an example of a recognition analysis performed by the GPS data engine (106), the geographic information associated with the image may correspond to a single asset at the geographic location in the financial application (155). In such a case, the GPS data engine (106) may identify, through the recognition analysis, that the asset at the geographic location in the financial application (155) is the same as the object in the image. As a result, the GPS data engine (106) may associate the object in the image with the asset at the geographic location in the financial application (155).

As another example of a recognition analysis, the GPS data engine (106) may determine that multiple assets may exist at the geographic location in the financial application (155) that corresponds to a geographic location associated with an image. After the image is processed by the text recognition module (112) (described below), identified text is received by the GPS data engine (106). The GPS data engine (106) may then perform a recognition analysis using both the geographic location and the identified text in an attempt to identify the object in the image and associate the object with an asset in the financial application (155).

A recognition analysis using the identified text may be performed by the GPS data engine (106) in one of a number of ways. For example, the GPS data engine (106) may compare the identified text from the image to a number of descriptions, associated with a number of assets at the geographic location, in the financial application (155). The GPS data engine (106) may then find a match between (i.e., identify) the identified text and one of the descriptions associated with one of the assets at the geographic location in the financial application (155). Based on the results of this recognition analysis, the GPS data engine (106) may then associate the object in the image with the asset in the financial application (155).

As another example of a recognition analysis, the GPS data engine (106) may determine that multiple assets, with the same identified text (if any identified text exists), may exist at the geographic location in the financial application (155) that corresponds to a geographic location associated with an image. After the image is processed by the object recognition module (114) (described below), an identified object is received by the GPS data engine (106). The GPS data engine (106) may then perform a recognition analysis using the geographic location, the identified object, and, if available, the identified text in an attempt to identify the object in the image and associate the object with an asset in the financial application (155).

A recognition analysis using the identified object may be performed by the GPS data engine (106) in one of a number of ways. For example, the GPS data engine (106) may compare the identified object (including the features of the identified object) from the image, as well as the identified text, if any, to one or more features, associated with a number of assets at the geographic location, in the financial application (155). The GPS data engine (106) may then find a match between (i.e., identify) one or more features of the identified object and one or more descriptions of features, associated with one or more assets at the geographic location, in the financial application (155). Based on the results of this recognition analysis, the GPS data engine (106) may then associate the object in the image with the asset in the financial application (155).

In one or more embodiments of the invention, the GPS data engine (106) may be unable to identify an object in an image. For example, the object may be too blurry to identify and/or the image may not include GPS data. In such a case, the GPS data engine (106) may send a notification to the user (150), using the application interface (126), to notify the user (150) that the object in the image cannot be identified and/or request a new image of the object. Such notification may include details as to the nature of the problem and/or potential solutions for the user (150) to solve the problem.

In one or more embodiments of the invention, the GPS data engine (106) is further configured to associate an object in an image with an asset of an owner in a financial application (155). The GPS data engine (106) may determine an association between an object in an image and an asset in the financial application (155) based on the geographic location of the object. Further, the GPS data engine (106) may associate an object in an image with an asset of an owner in a financial application (155) based on a recognition analysis of the image. The GPS data engine (106) may be configured to associate an object in an image with an asset in the financial application (155) in a number of ways. For example, the GPS data engine (106) may compare the object with a number of assets in the financial application (155) that are located in the geographic location (described below). The GPS data engine (106) may then determine (using, for example, the results of the recognition analysis and descriptions (e.g., license plate number, serial number, name, address, identification number) of the assets in the financial application (155)) that one of the assets matches the object. Based on determining that the object matches one of the assets, the GPS data engine (106) may associate the object with the asset.

In one or more embodiments of the invention, the GPS data engine (106) is also configured to send a request to the user (150) to confirm that the association between the object in the image and the asset in the financial application (155) is correct. The GPS data engine (106) may further be configured to receive, in response to the request, confirmation from the user (150) that the association between the object in the image and the asset in the financial application (155) is correct.

In one or more embodiments of the invention, the GPS data engine (106) may be unable to associate an object in an image with an asset in the financial application (155). For example, the object identified in the image may not be listed as an asset of the owner in the financial application (155). In such a case, the GPS data engine (106) may send a notification to the user (150), using the application interface (126), to notify the user (150) that the object in the image cannot be associated with an asset in the financial application (155). Such notification may include details as to the nature of the problem and/or potential solutions for the user (150) to solve the problem. Alternatively, the GPS data engine (106) may create a new asset in the financial application (155), where an association is made between the object in the image and the new asset and where any features identified by the GPS data engine (106) from a recognition analysis may be included as descriptions of the new asset in the financial application (155). In such a case, the GPS data engine (106) may send a notification to the user (150), using the application interface (126), to notify the user (150) that the object in the image corresponds to a newly-added asset in the financial application (155). Such notification may specify the new asset and where it may be located in the financial application (155). Such notification may also ask the user (150) to confirm the addition of the new asset in the financial application (155).

In one or more embodiments of the invention, the GPS data engine (106) is further configured to store an image of an object associated with the asset of an owner in the financial application (155). Specifically, the image and associated information may be stored the GPS data engine (106) in the images (132) and/or prior results (136) of the storage repository (130).

Continuing with FIG. 1, the GPS data reading module (108) is operatively connected to the GPS data engine (106) and configured to process an image with GPS data to generate processed GPS data. The GPS data reading module (108) may generate processed GPS data in one of a number of ways. For example, the GPS data reading module (108) may obtain the GPS data from the image. Once the GPS data is obtained from the image, the GPS data reading module (108) may determine geographic coordinates using the GPS data. In one or more embodiments of the invention, the processed GPS data includes the geographic coordinates. If the GPS data from the image is already processed (i.e., includes the geographic coordinates), then the GPS data reading module (108) may return the image without further processing the GPS data Continuing with FIG. 1, the GPS mapping module (110) is operatively connected to the GPS data engine (106) and configured to determine the geographic location of the object in the image. The GPS mapping module (110) may determine the geographic location using the processed GPS data. A geographic location may be any term or set of terms that may be used to identify a place where one or more assets of the owner may be found. Examples of a geographic location include, but are not limited to, latitude/longitude coordinates, a street address, a zip code, a store name, a name of a park, and a city. Some geographic locations, such as a street address, may also include other information, such as a name of a business located at the street address. The GPS mapping module (110) may determine some or all of the geographic location using one or more data sources (180).

Optionally, in one or more embodiments of the invention, the text recognition module (112) of the GPS data application (104) is operatively connected to the GPS data engine (106) and configured to identify text in an image. Text may be any symbol or character (e.g., a letter, a number) or series of symbols and/or characters (e.g., a word or series of words, a license plate number) that are part of the image. The text recognition module (112) may be configured to recognize text using character recognition software. Character recognition software may be any software adapted to translate images of letters, numbers, and/or other characters into machine-encoded text. The character recognition software may also be adapted to read and interpret the machine-encoded text. Examples of character recognition software include, but are not limited to, optical character recognition (OCR) software, intelligent character recognition (ICR) software, and intelligent word recognition (IWR) software.

The text recognition module (112) may be configured to recognize text in the image in one of a number of ways. For example, the text recognition module (112) may obtain text from an image using character recognition software. The text recognition module (112) may then read and interpret the text to generate identified text, which may then be used by the GPS data engine (106) in performing a recognition analysis. The text recognition module (112) may use information provided by one or more data sources (180) to help identify, read, and/or interpret the text to generate the identified text.

Optionally, in one or more embodiments of the invention, the object recognition module (114) of the GPS data application (104) is operatively connected to the GPS data engine (106) and configured to identify an object in an image. The object recognition module (114) may identify the object in an image using object recognition software. Object recognition software may be any software adapted to identify and recognize one or more objects in an image, where the recognizing the object is based on a partial or a whole image of the object. In one or more embodiments of the invention, object recognition software includes other capabilities associated with computer vision, including but not limited to video tracking, motion estimation, and image restoration. Object recognition software may use one or more algorithms to identify the object in the image, including but not limited to appearance-based methods, feature-based methods, and recognition by parts.

In one or more embodiments of the invention, the object recognition software used by the object recognition module (114) also recognizes one or more features of the object. A feature of an object may be any characteristic that may identify, at least in part, the object. Examples of features of an object that may be recognized by the object recognition module (114) include, but are not limited to, a height of the object, a color or colors of the object, and a pose or position of the object. In one or more embodiments of the invention, an identified object is based, at least in part, on one or more features that are identified using the object recognition software. For example, the object recognition software may identify an object in an image to be a truck. The object recognition software may also identify features of the truck, such as the color (red), the height of the truck, the length of the truck, the size of the tires, and any dents in the body of the truck.

The object recognition module (114) may be configured to recognize an object in the image in one of a number of ways. For example, the object recognition module (114) may detect one or more features of an object using object recognition software. The object recognition module (114) may then identify, based on at least one of the features, the object to generate an identified object, which may then be used by the GPS data engine (106) in performing a recognition analysis. The object recognition module (114) may use information provided by one or more data sources (180) to help identify an object to generate the identified object.

In one or more embodiments of the invention, the GPS data application (104) is extensible. In other words, the GPS data application (104) may be modified (e.g., additional modules may be added) to perform specific tasks that may not be listed above. For example, the GPS data application (104) may include an additional module configured to read the GPS data from an image and determine a mailing address. A further configuration of the GPS data application (104) may include an additional module configured to compare the mailing address with known owner data to find a most likely match. As another example, the GPS data application (104) may include an additional module configured to determine (based on, for example, an email address used to send the image and associated GPS data) an owner and/or financial application (155) to associate with the image.

As a further example, the GPS data application (104) may include an additional module configured to identify the shape of a motor vehicle in the image. A further configuration of the GPS data application (104) may include an additional module configured to recognize a license plate number of the motor vehicle in the image. Still a further configuration of the GPS data application (104) may include an additional module configured to find information about the owner using the license plate number. As another example, the GPS data application (104) may include an additional module configured to, upon associating an object in an image with an asset of the owner, send a notification to the owner and/or user (150) using a communication medium, including but not limited to email, Twitter®, and Facebook®. (Twitter® is a registered trademark and service mark of Twitter, Inc. of San Francisco, Calif.; Facebook® is a registered service mark of Facebook, Inc. of Palo Alto, Calif.) As another example, the GPS data application (104) may include an additional module configured to, after associating an object in an image with an asset of the owner, deliver the image to the financial application (155).

Continuing with FIG. 1, the processor (120) within the computer system (102) is configured to execute software in accordance with one or more embodiments of the invention. Specifically, the processor (120) may be configured to execute the computer system (102) or any of the engines, modules, and repositories described above and shown in FIG. 1, as well as software used by the user (150), the image capture device (160), one or more GPS sources (170), and/or one or more data sources (180). The processor (120) may be an integrated circuit, a central processing unit, a multi-core processing chip, a multi-chip module including multiple multi-core processing chips, or other hardware processor. The processor (120) may be known by other names, including but not limited to a computer processor, a microprocessor, a hardware processor, and a multi-core processor. In one or more embodiments of the invention, the processor (120) is configured to execute software instructions stored in memory (122). The memory (122) may include one or more cache memories, main memory, and/or any other suitable type of memory. The memory (122) may be discretely located on the computer system (102) relative to the processor (120). In certain configurations, the memory (122) may also be integrated with the processor (120).

Optionally, in one or more embodiments of the invention, the security module (128) is configured to secure interactions between the computer system (102) and the user (150), the image capture device (160), and/or a data source (180). More specifically, the security module (128) may be configured to authenticate communication from software based on security keys verifying the identity of the source of the communication. For example, user software may be associated with a security key enabling the user software to interact with the computer system (102). Further, the security module (128) may be configured to restrict the transmission of information (e.g., image of an object, a notification), as well as access to information. For example, the user software may be restricted to only access an image associated with an asset associated with a specific owner in the financial application (155). Further, the user software may be restricted to provide only an image associated with a particular asset of the owner.

The user software, image capture device software, and/or data source software may be configured to interact with the computer system (102) using a browser extension. In this case, the browser extension may maintain an active session with the computer system (102) after the security module (128) has authenticated the user software, image capture device software, and/or data source software. For example, the browser extension may continue to interact with the computer system (102) as the user views various web content in the user software. In this example, the browser extension may receive notifications from the computer system (102) for presenting to the user (150). Similarly, the image capture device software may be configured to interact with one or more GPS sources (170) using a browser extension.

As discussed above, the user may use a user system. Further, the image capture device, GPS source, and data source may reside on an image capture device system, GPS source system, and data source system, respectively. One or more of the user system, image capture device system, GPS source system, and data source system may be, or may contain a form of, an Internet-based or an intranet-based computer system that is capable of communicating with the user software, image capture device software, GPS source software, and data source software. A computer system may include any type of computing device and/or communication device, including but not limited to computer system (102). Examples of the user system, image capture device system, GPS source system, and data source system may include, but are not limited to, a desktop computer with Internet or intranet access, a laptop computer with Internet or intranet access, a smart phone, a server, a server farm, and a personal digital assistant (PDA). The user system, image capture device system, and/or data source system may correspond to a computer system as described below with regard to FIG. 2.

Further, as discussed above, the user system, image capture device system, GPS source system, and/or data source system may each have corresponding software (e.g., user software, image capture device software, GPS source software, and data source software, respectively). The user software, image capture device software, GPS source software, and data source software, may execute on a separate device (e.g., a server, mainframe, desktop personal computer (PC), laptop, personal desktop assistant (PDA), television, cable box, satellite box, kiosk, telephone, mobile phone, or other computing devices) from the computer system (102), the user (150), the image capture device (160), the one or more GPS sources (170), and/or the one or more data sources (180), and may be coupled by a network (e.g., Internet, Intranet, Extranet, Local Area Network (LAN), Wide Area Network (WAN), or other network communication methods), with wired and/or wireless segments. The user software may also be part of, or operate separately but in conjunction with, the computer system (102) and/or the financial application (155).

In one or more embodiments of the invention, one or more of the user software, image capture device software, GPS source software, and data source software, is configured to display web page(s) (i.e., web content). More specifically, the user software, image capture device software, GPS source software, and data source software, may be any software capable of rendering Hypertext Markup Language (HTML) in one or more embodiments of the invention. For example, the user software, image capture device software, GPS source software, and data source software, may be a web browser(s) used by the corresponding system to access web pages (i.e., web content) over the Internet (or other Wide Area Network or Local Area Network). One or more of the user software, image capture device software, GPS source software, and data source software, may also be configured to display data in other formats, including but not limited to JavaScript®, JavaScript® Object Notation (JSON) and XML. (JavaScript is a registered trademark and service mark of Oracle America, Inc. of Redwood Shores, Calif.)

In one or more embodiments of the invention, one or more of the user software, image capture device software, GPS source software, and data source software, provides support for browser extension(s). More specifically, one or more of the user software, image capture device software, GPS source software, and data source software, may provide an open framework (i.e., software design that allows for easy removal, addition, and/or replacement of software components) for adding features to the user software, image capture device software, GPS source software, and/or data source software. In this case, a browser extension may be an application that extends the functionality of the software using the open framework. The user software may interact with the computer system (102) and/or the image capture device (160) using the browser extension(s). Further, the browser extension(s) may be configured to interact with a user interface of the user software (as well as an image capture device interface of image capture device software, a GPS source interface of GPS source software, and a data source interface of data source software).

Figure 2:
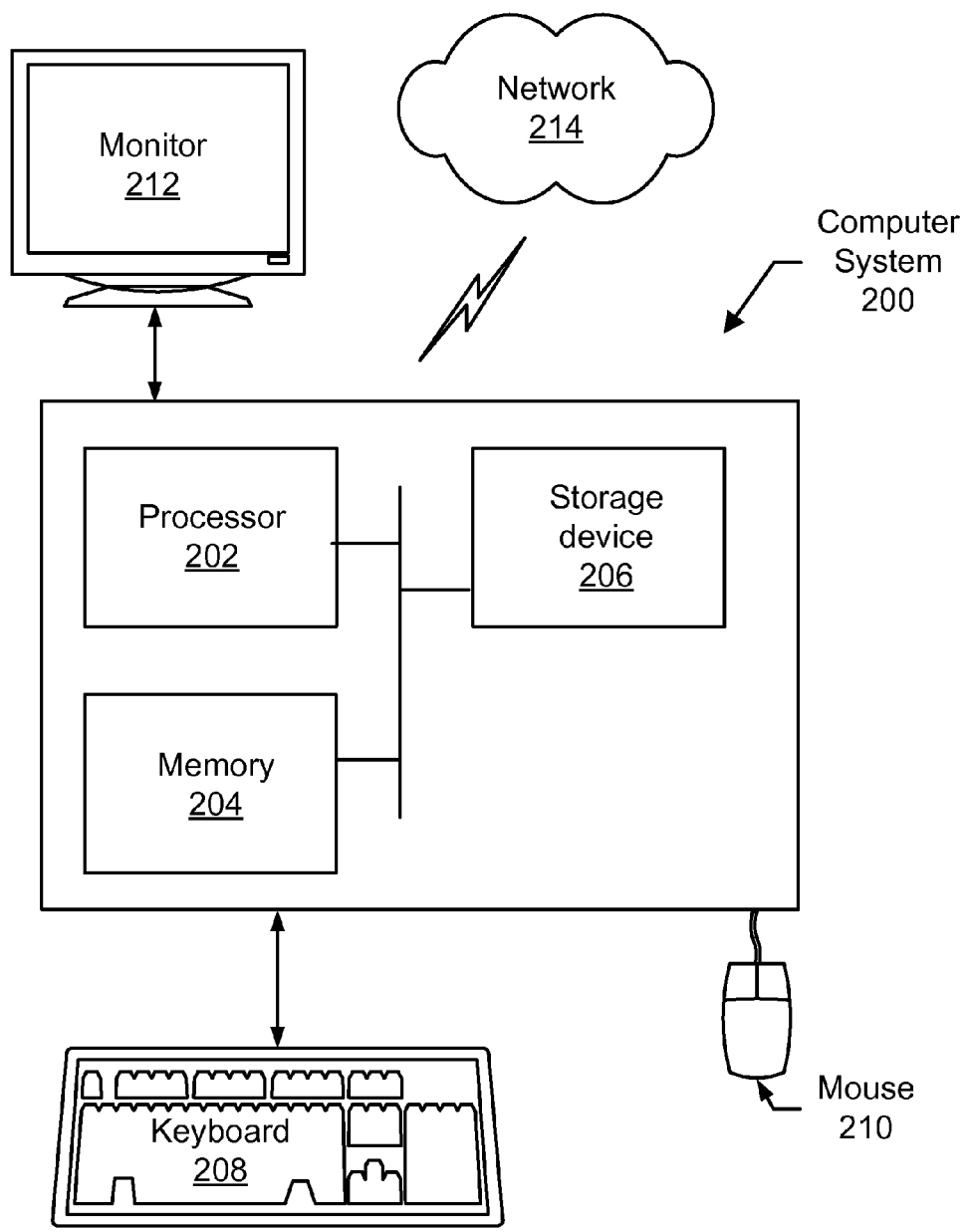
FIG. 2 shows a computer system in accordance with one or more embodiments of the invention.

FIG. 2 shows a computer system (200) on which one or more embodiments of a system (e.g., the user system, an image capture device system, a data source system, as described above with respect to FIG. 1) may be implemented. The computer system (200) of FIG. 2 may be virtually any type of computer regardless of the platform being used. For example, as shown in FIG. 2, the computer system (200) includes one or more processor(s) (202) such as an integrated circuit, a central processing unit (CPU), or other hardware processor, associated memory (204) (e.g., random access memory (RAM), cache memory, flash memory, etc.), a storage device (206) (e.g., a hard disk, an optical drive such as a compact disk drive or digital video disk (DVD) drive, a flash memory stick, etc.), and numerous other elements and functionalities typical of today's computers (not shown). The computer system (200) may also include input means, such as a keyboard (208), a mouse (210), or a microphone (not shown). Further, the computer system (200) may include output means, such as a graphical display (212) (e.g., a liquid crystal display (LCD), a light-emitting diode (LED) display, a plasma display, or cathode ray tube (CRT) monitor). The computer system (200) may be connected to a network (214) (e.g., a local area network (LAN), a wide area network (WAN) such as the Internet, or any other similar type of network) via a network interface connection (not shown). Many different types of computer systems exist, and the aforementioned input and output means may take other forms, now known or later developed. Generally speaking, the computer system (200) includes at least the minimal processing, input, and/or output means necessary to practice embodiments of the invention.

Further, one or more elements of the aforementioned computer system (200) may be located at a remote location and connected to the other elements over a network. Further, embodiments of the invention may be implemented on a distributed system having a plurality of nodes, where each portion of the invention (e.g., GPS data engine, GPS data reading module, GPS mapping module) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a non-transitory computer readable storage medium such as a compact disc (CD), a diskette, a tape, or any other physical computer readable storage device.

Figure 3:
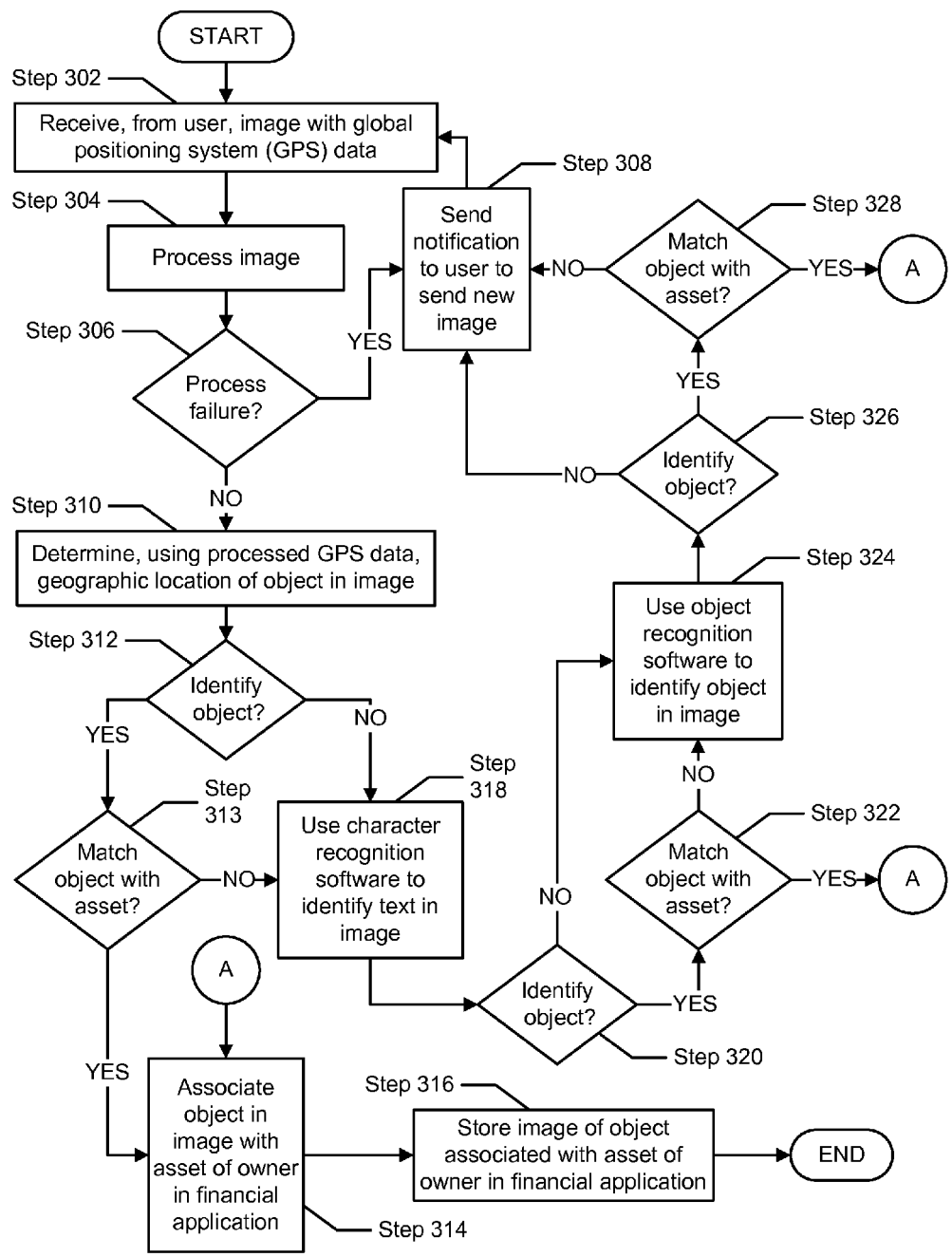
FIG. 3 shows a flowchart of a method in accordance with one or more embodiments of the invention.

FIG. 3 shows a flowchart of a method for associating an object in an image with an asset in a financial application in accordance with one or more embodiments of the invention. While the various steps in these flowcharts are presented and described sequentially, some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, additional steps, omitted in FIG. 3, may be included in performing this method. Accordingly, the specific arrangement of steps shown in FIG. 3 should not be construed as limiting the scope of the invention.

In Step 302, an image with GPS data is received. In one or more embodiments of the invention, the image may be of an object to be associated with an asset of the owner in the financial application. The image may be received from the user using an image capture device. Alternatively, the image may be received from a third party (e.g., an employee of the user, an agent of the user) using an image capture device. The image may also be received directly from the image capture device used to capture the image. The image capture device may include GPS functionality to provide the GPS data (i.e., geotagging) associated with the image. The GPS data may include latitude and longitude coordinates, an altitude, a bearing, a distance, a name of a place, other geopositioning data, and/or any combination thereof.

In one or more embodiments of the invention, the image may be received automatically upon the occurrence of an event (e.g., the passage of time such that all images capture during the time period are received, upon capturing a certain number of pictures with the image capture device) as set by default, by the user, by the owner, or by some other entity. The image may also be received based on a manual action (e.g., email with the image attached, text message containing the image) by the sender of the image. Further, the image may be received with additional data. The additional data may be used to help describe the object in the image. For example, the image may be received as an attachment of an email with a subject heading of "boat."

In one or more embodiments of the invention, more than one object may be captured in an image. In cases where multiple objects are captured in the same image, each object may be processed, identified, and matched with an asset in the financial application individually. For example, an image taken at a storage facility in Detroit, Mich. may include two antique cars (a 1910 model 19 Buick® and a 1920 Hudson race car) that are entered in the financial application. (Buick® is a registered trademark of General Motors LLC of Detroit, Mich.) Each car in the image may be individually processed, identified, and matched with an asset in the financial application in series or in parallel with each other. In one or more embodiments of the invention, a particular computing device, as described, for example, in FIGS. 1 and 2 above, is used to receive the image with GPS data.

In Step 304, the image is processed. In one or more embodiments of the invention, processing the image generates processed GPS data. The image may be processed by retrieving the GPS data from the image and obtaining geographic coordinates from the GPS data. The geographic coordinates may be obtained using a data source, a GPS source, some other suitable source, or any combination thereof. The processed GPS data may include the geographic coordinates. In one or more embodiments of the invention, the image received in Step 302 is already processed (i.e., already includes geographic coordinates). In one or more embodiments of the invention, a particular computing device, as described, for example, in FIGS. 1 and 2 above, is used to process the image.

In Step 306, a determination is made as to whether a failure occurs in processing the image. In one or more embodiments of the invention, a failure occurs in processing the image when geographic coordinates cannot be derived from the GPS data. The geographic coordinates may not be derived from the GPS data for one or more reasons. For example, the image may not have any GPS data, resulting in a failure to process the image. An image may not have any GPS data if, for example, the image capture device does not have GPS functionality or the GPS functionality on the image capture device was disabled when the image was captured. As another example, the GPS functionality of the image capture device may have malfunctioned when the image was captured. In such a case, erroneous and/or incomplete GPS data may prevent the image from being processed. As a further example, while the GPS functionality of the image capture device may have been working properly at the time the image was captured, the GPS data received from a GPS source by the image capture device may be erroneous. In such a case, erroneous and/or incomplete GPS data may prevent the image from being processed. In one or more embodiments of the invention, a particular computing device, as described, for example, in FIGS. 1 and 2 above, is used to determine whether a failure occurred in processing the image. If a failure occurs in processing the image, then the process proceeds to Step 308. If a failure does not occur in processing the image, then the process proceeds to Step 310.

In Step 308, a notification is sent to the user to send a new image. In one or more embodiments of the invention, the notification notifies the user that a problem exists preventing the image from being processed. The notification may include details as to the problem encountered (e.g., no GPS data with the image, an asset matching the image is not in the financial application) that prevents the image from being processed. Further, the notification may suggest how the problem may be corrected by the user.

For example, if the image has no GPS data, the notification may state, "The image you submitted could not be processed because the image did not include any GPS data. The image capture device you used may not have GPS functionality or the GPS functionality may be disabled. Please enable the GPS functionality in your image capture device, recapture the image, and submit again." As another example, the notification may say, "The object in the image you submitted could not be identified. The object appears to be too blurry to properly process and identify. Please resubmit a clearer image of the object." As a further example, the notification may say, "The image you submitted has been identified as a green 2006 Lamborghini® Gallardo® SE located at a storage facility in Fresno, Calif. This asset is not listed in the financial application, either in Fresno or any other location. If the image captures an asset of the owner, please enter the asset in the financial application. Otherwise, please submit another image for processing." (Lamborghini® and Gallardo® are each registered trademarks of Automobili Lamborghini Holding S.p.A. Corporation of Sant'Agata Bolognese, Italy.) In one or more embodiments of the invention, a particular computing device, as described, for example, in FIGS. 1 and 2 above, is used to send the notification to the user to send a new image.

In Step 310, the geographic location of the object in the image is determined using the processed GPS data. In one or more embodiments of the invention, the geographic coordinates in the processed GPS data is translated into a geographic location, as described above. In one or more embodiments of the invention, a particular computing device, as described, for example, in FIGS. 1 and 2 above, is used to determine, using the processed GPS data, the geographic location of the object in the image.

In Step 312, a determination is made as to whether the object in the image is identified. In one or more embodiments of the invention, the geographic location is used to identify the object in the image. The object may be identified by performing a recognition analysis of the image. A recognition analysis may be one or more evaluations conducted to identify the object in the image. In this Step 312, the recognition analysis may compare the geographic location with any assets in the financial application that are associated with the geographic location. The recognition analysis may also evaluate any additional information (e.g., the additional information described above with respect to Step 302) received with the image.

As an example of the recognition analysis for Step 312, if the geographic location derived from the processed GPS data is an address of a summer cabin listed in the financial application, then recognition analysis may recognize that the summer cabin is the only asset listed at the address in the financial application. Consequently, the recognition analysis may identify the object in the image as the summer cabin. The recognition analysis may also use the additional information that may have accompanied the image when the image was received. For example, if the image was sent as an attachment to an email entitled "summer cabin," then such additional information may be used, along with the address, to identify the object in the image as the summer cabin. Alternatively, if the financial application lists the summer cabin, a boat, a car, a motorcycle, a jet ski, and a workshop as assets that are all located at the address, then embodiments of the invention may determine that further recognition analysis of the image is required before the object in the image may be identified. In one or more embodiments of the invention, a particular computing device, as described, for example, in FIGS. 1 and 2 above, is used to determine whether the object in the image is identified. If the object is identified, then the process proceeds to Step 313. If the object is not identified, then the process proceeds to Step 318.

In Step 313, a determination is made as to whether the identified object in the image is matched to an asset in the financial application. In one or more embodiments of the invention, the determination as to whether the identified object in the image is matched to an asset in the financial application is based, at least in part, on the geographic location. For example, embodiments of the invention may begin by comparing the object (identified based on the recognition analysis) in the image with one or more assets in the financial application located at the geographic location. Embodiments of the invention may then determine that one of the assets in the financial application located at the geographic location matches the identified object in the image. The identified object in the image may not be matched to an asset in the financial application if there is not enough information to determine that the object is the asset in the financial application. For example, if the asset is a collection of cars located at a storage facility and the identified object in the image is a single car stored at the storage facility, then more information may be needed to determine which car of the collection of cars matches the car captured in the image.

In one or more embodiments of the invention, a particular computing device, as described, for example, in FIGS. 1 and 2 above, is used to determine whether the identified object in the image is matched to an asset in the financial application. If the identified object is matched to an asset, then the process proceeds to Step 314. If the identified object is not matched to an asset, then the process proceeds to Step 318. Optionally, even if the identified object in the image is matched to an asset in the financial application, the process may proceed, at the direction of the user or by default, to Step 318. For example, the user may want to ensure that the identified object is properly matched to the asset by performing an additional recognition analysis of the image using text recognition and/or object recognition.

In Step 314, the object in the image is associated with the asset of the owner in the financial application. In one or more embodiments of the invention, the object of the image is associated with the asset in the financial application by sharing one or more data attributes between the object in the image and the asset in the financial application. For example, when an image of an antique car is associated with an antique car listed as an asset in the financial application, the image metadata may include a description of "antique car," while features from the image of the antique car, not already listed as descriptions of the antique car, may be transferred to the financial application as descriptions of the antique car. In one or more embodiments of the invention, a particular computing device, as described, for example, in FIGS. 1 and 2 above, is used to associate the object in the image with the asset in the financial application.

Optionally, in one or more embodiments of the invention, a request may be sent to the user to confirm that the asset with which the object in the image is associated is correct. The request may be any communication that the user is capable of understanding. For example, the request may be sent to the user in an email, a text message, a pop-up window, spoken using voice software, conveyed to the user using some other suitable means of communication, or any combination thereof. The user may send a reply in response to the request. The reply may be received from the user in the same or a different manner in which the request was sent to the user. If the asset with which the object in the image is associated is correct, then the reply from the user may be a confirmation that the association is correct. If the reply from the user is a confirmation that the association is correct, then the process proceeds to Step 316. If the reply from the user is that the association is incorrect, then the process may proceed to Step 318. If the reply from the user is that the association is incorrect, the user may also supply, as part of the reply, additional information that may be used to correctly identify and/or associate the object in the image.

Continuing with FIG. 3, in Step 316, the image of the object associated with the asset of the owner is stored in the financial application and associated with the asset. The image may be stored automatically or at the request of the user. The image may be stored in a location designated by the user or in a default location. The image may be stored in multiple locations. The image may be stored in the financial application, in a remote storage repository, in some other suitable location, or any combination thereof. In one or more embodiments of the invention, a particular computing device, as described, for example, in FIGS. 1 and 2 above, is used to store the image of the object associated with the asset of the owner in the financial application. After Step 316 is completed, the process ends.

In Step 318, character recognition software is used to identify text in the image. In one or more embodiments of the invention, an image that includes the object may also include text. If text is included in the image, then the character recognition software may be used to identify and read the text. The text that is identified may be associated with the object in the image. In one or more embodiments of the invention, a particular computing device, as described, for example, in FIGS. 1 and 2 above, is used to identify text in the image using character recognition software. If the character recognition software is able to identify text in the image (i.e., generate identified text), then the process proceeds to Step 320. If the character recognition software is unable to identify text in the image, then the process may proceed to Step 324.

In Step 320, a determination is made as to whether the object in the image is identified. In one or more embodiments of the invention, the geographic location and the identified text is used to identify the object in the image. The object may be identified by performing a recognition analysis of the identified image and the identified text. In other words, in this Step 320, the recognition analysis may compare the geographic location with any assets in the financial application that are associated with the geographic location and that may be associated with the identified text. The recognition analysis may also evaluate any additional information (e.g., the additional information described above with respect to Step 302) received with the image.

The recognition analysis to evaluate identified text may involve multiple steps. For example, once the identified text is obtained from the image using the character recognition software, the identified text may be compared to one or more descriptions (e.g., serial number, license number, title, street address) associated with the assets located at the geographic location in the financial application. The text may then be matched to one of the descriptions associated with one of the assets in the financial application.

As an example of the recognition analysis for Step 320, the geographic location derived from the processed GPS data is an address where the owner has, listed as assets in the financial application, a summer cabin, a boat, a car, a motorcycle, a jet ski, and a workshop. The identified text in the image is determined (based on stored information and/or information received from a data source) to match the format of a registration number of a boat. Thus, embodiments of the invention identify, based on the identified text and the geographic location, the image as a boat. In one or more embodiments of the invention, a particular computing device, as described, for example, in FIGS. 1 and 2 above, is used to determine whether the object in the image is identified. If the object is identified, then the process proceeds to Step 322. If the object is not identified, then the process proceeds to Step 324.

In Step 322, a determination is made as to whether the identified object in the image is matched to an asset in the financial application. In one or more embodiments of the invention, the determination as to whether the identified object in the image is matched to an asset in the financial application is based, at least in part, on the geographic location, the identified text from the image, and a description of an asset in the financial application. For example, if the identified object is a car located in a storage facility in Sugar Land, Tex., and the identified text is license plate number "ABC 123" from Indiana, then the object in the image may be matched to one of a collection of ten cars owned by the owner and stored in the storage facility in Sugar Land, where the one car is listed in the financial application as having license plate number "ABC 128" from Indiana. A match of the identified text with a description of an asset in the financial application may be an identical match. Alternatively, the identified text may be matched with a description of an asset in the financial application when the two are substantially similar.

In one or more embodiments of the invention, the identified object and identified text in the image is not matched to a description of an asset in the financial application because there is not enough information to determine that the object is an asset in the financial application. For example, if the asset is a collection of fine porcelain figurines, all having a description in the financial application as being designed by the same artist, on loan by the owner to a museum for display, and if the identified object in the image is a single porcelain figurine located at the museum and the identified text is the last name of the artist, then more information is needed to determine which porcelain figurine of the collection of porcelain figurines matches the porcelain figurine captured in the image.

In one or more embodiments of the invention, a particular computing device, as described, for example, in FIGS. 1 and 2 above, is used to determine whether the identified object in the image is matched to an asset in the financial application.

If the identified object is matched to an asset in the financial application, then the process reverts to Step 314. If the identified object is not matched to an asset in the financial application, then the process proceeds to Step 324. Optionally, even if the identified object in the image is matched to an asset in the financial application, the process may proceed, at the direction of the user or by default, to Step 324. For example, the user may want to ensure that the identified object is properly matched to the asset by performing an additional recognition analysis of the image using object recognition.

In Step 324, object recognition software is used to identify the object in the image. In one or more embodiments of the invention, a particular computing device, as described, for example, in FIGS. 1 and 2 above, is used to identify the object in the image using object recognition software. If the object recognition software is able to identify an object in the image (i.e., generate an identified object), then the process proceeds to Step 326. If the object recognition software is unable to identify an object in the image, then the process reverts to Step 308.

In Step 326, a determination is made as to whether the object in the image is identified. In one or more embodiments of the invention, the geographic location, the identified text, and the identified object (e.g., the identified features of the object in the image) are used to identify the object in the image. The object may be identified by performing a recognition analysis of the identified image, the identified text, and/or the identified object. In other words, in this Step 326, the recognition analysis may compare the geographic location with any assets in the financial application that are associated with the geographic location and that may be associated with the identified text and the identified object. The recognition analysis may also evaluate any additional information (e.g., the additional information described above with respect to Step 302) received with the image.

In one or more embodiments of the invention, a recognition analysis of the identified object may involve one or more steps. For example, a recognition analysis of the identified may first involve detecting, using object recognition software, a number of features (e.g., colors, positions, dimensions) of the object in the image. The object recognition software may then identify, with possible help from one or more data sources, the object in the image based on at least one of the detected features.

As an example of the recognition analysis for Step 326, the geographic location derived from the processed GPS data is an address for a museum where the owner has loaned his collection of fine porcelain figurines, all designed by the same artist. The identified text in the image is determined (based on stored information and/or information received from a data source) to match the signature of the artist that designed the figurines. Further, based on the object recognition software, the object is determined to be a figurine, six inches in height, of a man with his arms crossed in front of his chest wearing a green jacket and brown pants. Thus, embodiments of the invention identify, based on the identified text, the identified object, and the geographic location, the image as a fine porcelain figurine with particular features. In one or more embodiments of the invention, a particular computing device, as described, for example, in FIGS. 1 and 2 above, is used to determine whether the object in the image is identified. If the object is identified, then the process proceeds to Step 328. If the object is not identified, then the process reverts to Step 308.

In Step 328, a determination is made as to whether the identified object in the image is matched to an asset in the financial application. In one or more embodiments of the invention, the determination as to whether the identified object in the image is matched to an asset in the financial application is based, at least in part, on the geographic location, the identified text from the image, and the identified object. Specifically, an object may be matched to an asset when one or more of the features of the identified object is matched to one or more descriptions and/or features of the asset in the financial application. For example, if the identified object is a fine porcelain figurine located in a museum in West Bloomfield, Mich., and if the identified text is the signature of the artist who designed the figurine, and if some of the features identified for the figurine include a six inch height, a man with his arms crossed in front of his chest, and wearing a green jacket and brown pants, then the object in the image may be matched to one of a collection of fine porcelain figurines owned by the owner and located at the museum in West Bloomfield, where the one figurine has features substantially identical to the features identified for the object in the image.

One or more embodiments of the invention may be extensible to include additional functionality. In other words, embodiments of the invention may be modified to perform specific tasks (e.g., additional recognition analysis and matching) that may not be listed above. For example, one or more embodiments of the invention may read the GPS data from an image and determine a mailing address for the owner. In this case, embodiments of the invention may compare the mailing address with known owner data to find the most likely match. As another example, one or more embodiments of the invention may determine (based on, for example, an email address used to send the image and associated GPS data) an owner and/or financial application to associate with the image.

As a further example, one or more embodiments of the invention may identify the shape of a motor vehicle in the image. A further configuration may recognize a license plate number of the motor vehicle in the image. Still a further configuration may find information about the owner using the license plate number. As another example, one or more embodiments of the invention may, upon associating an object in an image with an asset of the owner, send a notification to the owner and/or user using a communication medium, including but not limited to email, Twitter®, and Facebook®. As another example, one or more embodiments of the invention may deliver, after associating an object in an image with an asset of the owner, the image to a financial application.

In one or more embodiments of the invention, the identified object, the identified text in the image, and the identified object (e.g., the identified features of the object in the image) are not matched to an asset in the financial application because there is not enough information to determine that the object is an asset in the financial application or because the asset may not exist in the financial application. In one or more embodiments of the invention, a particular computing device, as described, for example, in FIGS. 1 and 2 above, is used to determine whether the identified object in the image is matched to an asset in the financial application. If the identified object is matched to an asset in the financial application, then the process reverts to Step 314. If the identified object is not matched to an asset in the financial application, then the process reverts to Step 308.

Figure 4:
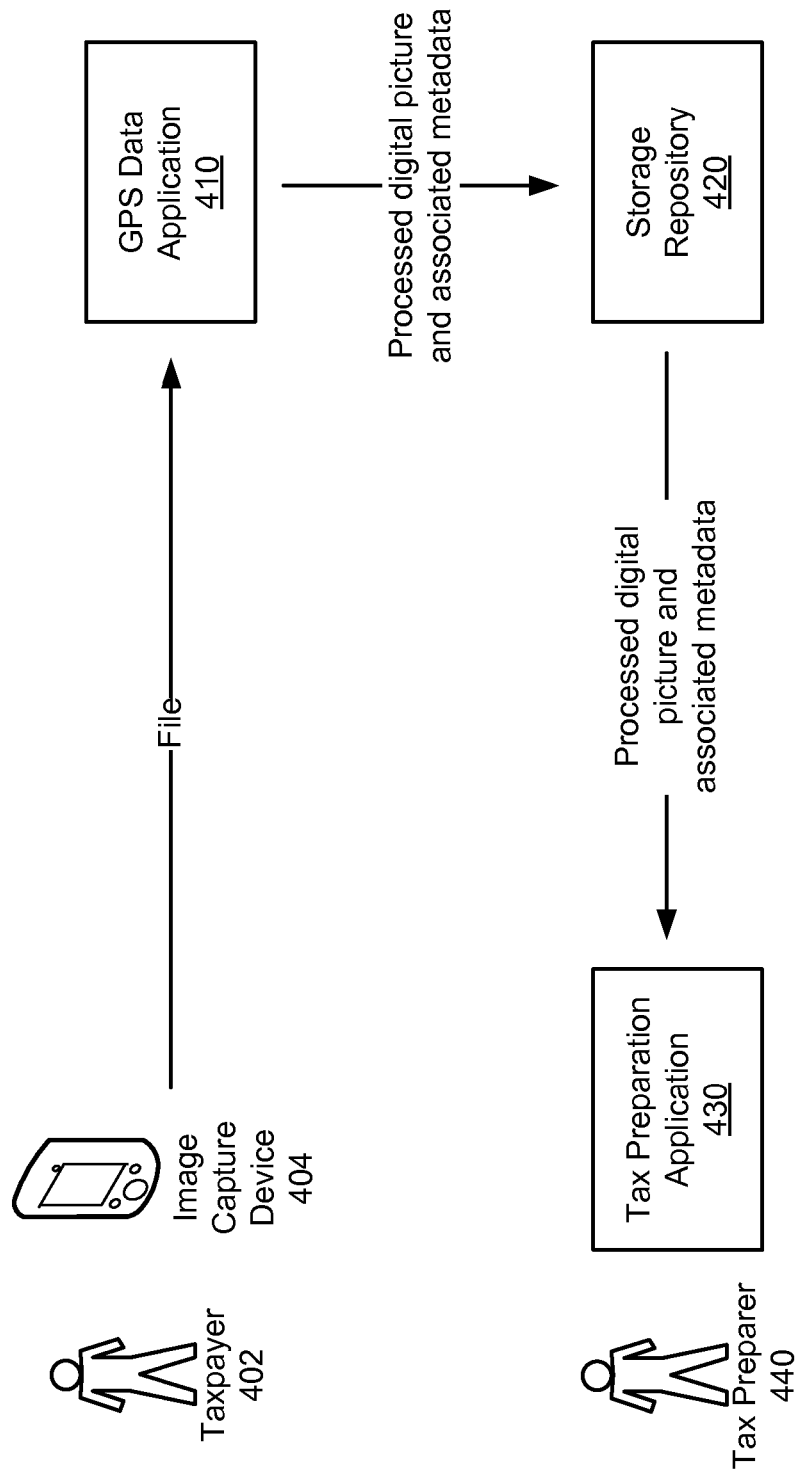
FIG. 4 shows a process flow diagram using one or more embodiments of the invention.

FIG. 4 shows a process flow diagram using one or more embodiments of the invention. Specifically, the process flow diagram shown in FIG. 4 uses one or more embodiments of the invention for preparing a tax return. The process flow diagram includes a taxpayer (402) with a camera (404), a GPS data application (410), a storage repository (420), a tax preparation application (430), and a tax preparer (440). The taxpayer (402) begins the process by using the camera (404) with GPS capability to take a digital picture of an asset owned by the taxpayer (402). In this case, the taxpayer (402) is an example of a user, and the camera (404) is an example of an image capture device. The taxpayer (402) may then use a computer (not shown) to collect the digital picture and the associated GPS data obtained with the camera (404). The taxpayer (402) may combine the digital picture and GPS data in a single file. The single file may also include other metadata provided by the taxpayer (402) and/or the camera (404).

The taxpayer (402) may send the digital picture and associated GPS data to the GPS data application (410), where the digital picture and associated GPS data are stored, either in the same file or as separate files. The GPS data application (410) receives and processes the digital picture and the GPS data. In processing the digital picture and the GPS data, the GPS data application (410) associates the object in the digital picture with an asset listed in the tax return. The GPS data application (410) may receive multiple digital pictures and determine an order in which to process the digital pictures. In processing the digital picture and the GPS data, the GPS data application (410) may store additional metadata (e.g., a link to an asset listed in the tax return) associated with the digital picture. Once the GPS data application (410) finishes processing a digital picture, the digital picture and associated metadata (e.g., GPS data, a link to an asset listed in the tax return) is sent to the storage repository (420).

Once in the storage repository (420), the processed digital picture and associated metadata is retrieved by the tax preparer (440) for the asset using the tax preparation application (430). In other words, the digital picture and associated metadata of the asset is used to prepare the tax return of the taxpayer (402). As an example, the taxpayer (402) may be an employee of a company using the digital camera (404) to take digital pictures of a fleet of company vehicles so that a different employee in the company's finance department can use the digital pictures and associated metadata to prepare financial statements and/or tax documents for current assets. In one or more embodiments of the invention, the taxpayer (402) and the tax preparer (440) is the same person or entity. For example, the taxpayer (402) may use the digital camera (404) to take pictures of a number of items the taxpayer (402) is donating. The pictures of the items may be used to help establish the condition (and thus the claimed value) of the items for the tax forms filed using a tax preparation application (430) or financial statements prepared by the entity.

The following description (in conjunction with FIG. 4) describes an example in accordance with one or more embodiments of the invention. The example is for explanatory purposes only and is not intended to limit the scope of the invention. Terminology used in FIGS. 1 through 4 may be used in the example without further reference to FIGS. 1 through 4.

EXAMPLE

Consider the following example, shown in FIGS. 5A through 5D, which describes associating an object in an image with an asset in a financial application in accordance with one or more embodiments described above. In the example, consider the scenario in which Courtney Henkel (504), the user, is an accountant for Construction Company, a small, locally-based construction company located in Girard, Ill. Courtney Henkel (504) is using a Construction Company-owned digital camera as an image capture device to capture images (take pictures) of the trucks the company owns. The digital camera used by Courtney Henkel (504) includes GPS functionality, which Courtney Henkel (504) enables before taking a picture of a pickup truck that Construction Company employees use to travel from the main office to a job site. Courtney Henkel (504) is at the main office, where he works and where all ten of the Construction Company-owned pickup trucks are located. Courtney Henkel (504) is taking the pictures of the pickup trucks (and other company assets) to provide support for the financial statements he is preparing.

Figure 5A:
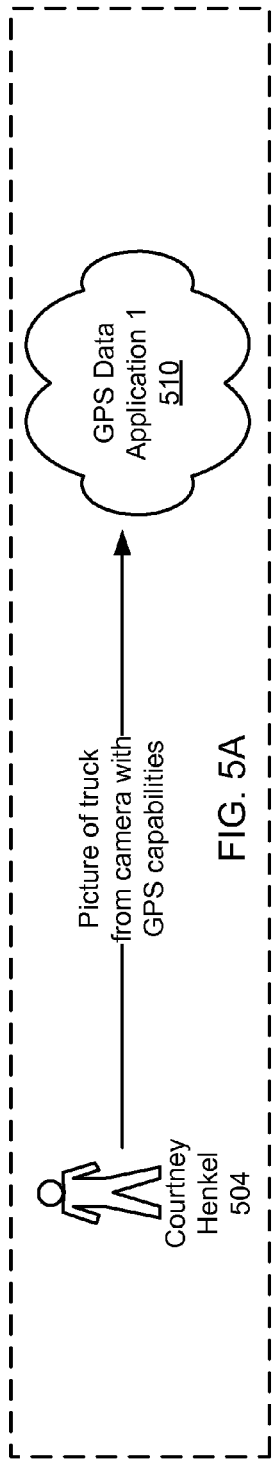
FIGS. 5A through 5D show an example in accordance with one or more embodiments of the invention.

As shown in FIG. 5A, Courtney Henkel (504) takes a picture of one of the trucks using the camera with the GPS functionality enabled. The picture is taken looking at the driver's side, so that the company logo on the driver's side door and the company vehicle number on the front quarter panel are captured in the picture. The camera in this example is also configured to automatically upload the pictures taken by the camera to a computer in the office of Courtney Henkel (504) inside the main office. A number of applications are loaded onto the computer of Courtney Henkel (504), including a financial application for creating financial statements and GPS data application 1 (510) featuring embodiments of the invention. When Courtney Henkel (504) takes a picture of one of the trucks, the picture is sent by the camera to the computer in the office of Courtney Henkel (504), where the picture of the truck and the associated GPS data are received by GPS data application 1 (510).

Figure 5B:
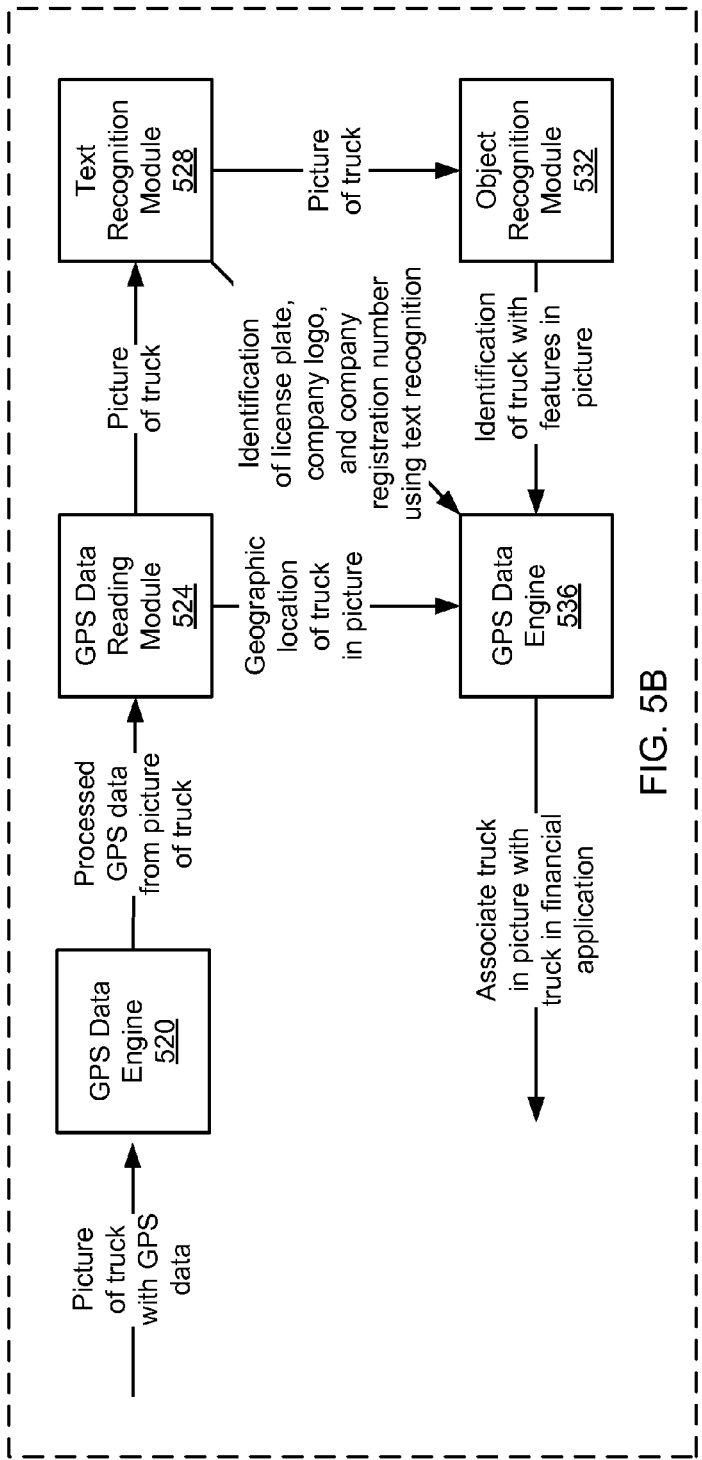

Upon receiving the picture of the truck with the GPS data, as shown in FIG. 5B, GPS data application 1 (510) associates the truck in the picture with a truck in the financial application in accordance with one or more embodiments described above. Initially, the picture of the truck with the GPS data is sent to the GPS data engine (520) to process the GPS data. When the GPS data is processed by the GPS data engine (520), the latitude and longitude of the location where the picture was taken is provided as processed GPS data. The picture of the truck, along with the processed GPS data, is then sent to the GPS data reading module (524). Upon receiving the picture of the truck with the processed GPS data, the GPS data reading module (524) determines that the processed GPS data corresponds to a geographic location, which in this example is the address of the main office in Girard, Ill.

The geographic location of the picture is then sent to the GPS data engine (536), which may be the same as the GPS data engine (520) described above. The GPS data engine (536) performs a recognition analysis using the geographic location and determines that a large number of assets, including the ten pickup trucks, are included at the geographic location in the financial application. Since the asset in the picture cannot be identified based solely on the geographic location, the GPS data engine (536) sends (or instructs the GPS data reading module (524) to send) the picture of the truck to the text recognition module (528). The text recognition module (528) uses character recognition software to identify text in the picture. The character recognition software identifies text on the driver's side door and the front quarter panel. Specifically, the identified text on the driver's side door reads "Construction Company, Girard, Ill." and the identified text on the front quarter panel reads "2008-8-CC." The identified text is then sent to the GPS data engine (536).

Upon receiving the identified text, the GPS data engine (536) performs a recognition analysis to identify the object in the picture using the geographic location and the identified text. In this case, the GPS data engine (536) determines that four assets in the financial application are possible matches with the object in the picture. The reason that four assets are possible matches is that Construction Company puts its company logo on almost every asset it owns, including chairs, vehicles, bookshelves, and computers. Further, Construction Company places a company number on almost every asset it owns. The numbering system is simple in that, for every asset class (e.g., chairs, vehicles, bookshelves, and computers), the number assigned to the item is the year in which the item was purchased, followed by a dash, followed by the number of that item that was purchased in that year, followed by a dash, followed by "CC" to designate Construction Company. In other words, in this example, the company bought and labeled, both with the company logo and the company number, at least eight chairs, eight vehicles, eight bookshelves, and eight computers in 2008. Consequently, the GPS data engine (536) is still unable to identify the object in the picture.

Continuing with FIG. 5B, the GPS data engine (536) sends (or instructs the text scanning module (528) to send) the picture of the truck to the object recognition module (532). The object recognition module (532) uses object recognition software to identify an object in the picture. The object recognition software identifies the object as a vehicle. The object recognition software may also identify features of the vehicle, such as a pickup truck that is 72 inches tall, 210 inches long, has 16 inch tires, has a dent on the rear quarter panel, and is white in color. The identified object (which includes the features of the object) is then sent to the GPS data engine (536).

Upon receiving the identified object, the GPS data engine (536) performs a recognition analysis to identify the object in the picture using the geographic location, the identified text, and the identified object. In this case, the GPS data engine (536) determines that a pickup truck is the only asset in the financial application that matches the results of the recognition analysis. The GPS data engine (536) then associates the truck in the picture with the pickup truck in the financial application.

Figure 5C:
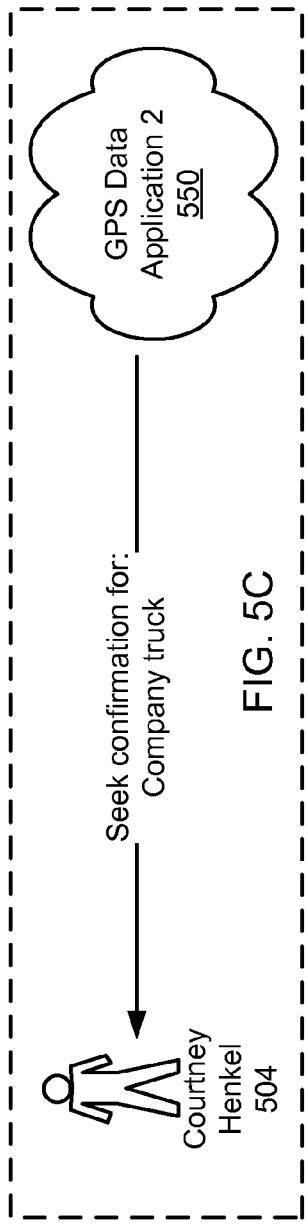
Figure 5D:
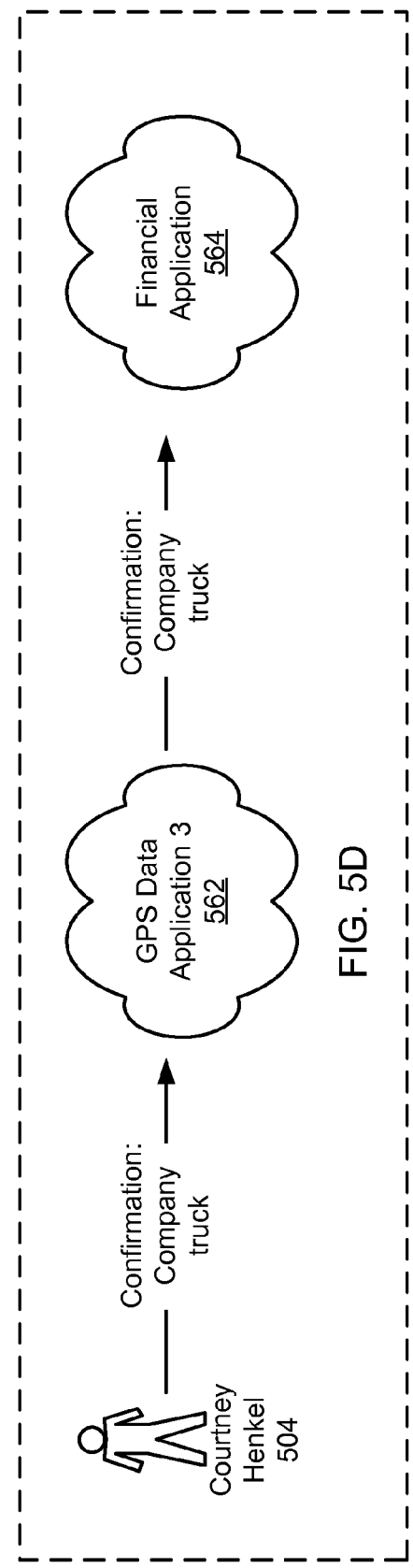

Optionally, as shown in FIG. 5C, GPS data application 2 (550), which may be the same as GPS data application 1 (510) in FIG. 5A, may send a request for confirmation to the user (i.e., Courtney Henkel (504)) that the object in the picture is a company truck. The request for confirmation may include other details about the truck to help the user provide confirmation. If a request for confirmation is sent, then, as shown in FIG. 5D, the user (i.e., Courtney Henkel (504)) may send a confirmation that the object in the picture is correctly identified with the truck in the financial application. The confirmation may be sent to GPS data application 3 (562), which may be the same as GPS data application 1 (510) in FIG. 5A and/or GPS data application 2 (550) in FIG. 5C. GPS data application 3 (562) may then send the confirmation to the financial application (564) to associate the truck in the picture with the truck in the financial application (564). Further, GPS data application 3 (562) may store the picture.

One or more embodiments of the invention provide for associating an object in an image with an asset in a financial application. Specifically, embodiments of the invention allow a user to automatically associate an object in an image with an asset in a financial application using GPS data associated with the image. The process of identifying an object in an image and of associating the object in the image with an asset in a financial application is typically a manual process (e.g., a user identifies the object and associates the object with an asset in the financial application). Embodiments of the invention may reduce the amount of time spent by the user and the number of errors that may occur by the user manually identifying an object in an image and/or associating the object with an asset.

In embodiments of the invention, the user may be a person, a financial professional, an accountant, an insurance claims adjuster, an inventory manager, a trustee, a conservator of an estate, or some other entity associating one or more objects in one or more images with one or more assets in a financial application. Embodiments of the invention may apply to a number of industries and applications. For example, in embodiments of the invention, the user may be a finance professional preparing financial statements, including current assets, for a company. In such a case, the user may use embodiments of the invention to substantiate depreciation values, appraisal values, present values, ownership, claim of title, and any of a number of other factors that may affect a financial statement involving assets of the company.

As another example, embodiments of the invention may be used by an insurance claims adjuster trying to settle a claim for a damaged asset insured by an insurance company based on a policy purchased by an owner of the asset. In such a case, embodiments of the invention may be used to substantiate and/or settle the claim submitted by the owner of the asset. In such a case, the claims adjuster may use embodiments of the invention to help determine, for example, whether a car involved in an accident should be declared a total loss and whether the amount of repairs claimed by a repair shop repairing damages incurred by an insured vehicle in an accident are reasonable.

As another example, a trustee of a trust and/or conservator of an estate that includes a number of assets may use embodiments of the invention to help maintain a current inventory of the trust/estate. Embodiments of the invention may also be used to help value one or more assets in a trust/estate that are being considered for sale.

As a further example, a person (e.g., an archeologist, a museum curator) who works with artifacts (e.g., pottery, jewelry, tools), as at a museum or excavation site, may use embodiments of the invention to help determine and track a condition of an artifact. Embodiments of the invention may also be used to help value one or more artifacts that are being considered for sale. Embodiments of the invention may be used for other practical purposes, and modules providing additional functionality may be added to embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for associating an object in an image with an asset of a plurality of assets in a financial application, the method comprising:

receiving the image of the object comprising global positioning system (GPS) data, wherein the image is captured using an image-taking device with GPS functionality;

processing, using a computer processor, the image to generate processed GPS data;

determining, using the computer processor and the processed GPS data, a geographic location of the object in the image;

identifying, using the computer processor and the geographic location of the object, the asset corresponding to the object by performing a recognition analysis of the image, wherein performing the recognition analysis comprises:

identifying a subset of the plurality of assets in the financial application located at the geographic location of the object, wherein the financial application stores a plurality of locations of the plurality of assets before the image is received;

associating, based on the recognition analysis, the object in the image with the asset of the plurality of assets of an owner in the financial application; and storing, in the financial application, the image of the object associated with the asset of the plurality of assets of the owner.

2. The method of claim 1, wherein identifying the object by performing the recognition analysis of the image further comprises:

obtaining from the image, using character recognition software, a plurality of text;

comparing the plurality of text to a plurality of descriptions, associated with the subset of the plurality of assets, in the financial application;

matching the plurality of text to one of the plurality of descriptions in the financial application, wherein the one of the plurality of descriptions is associated with the asset; and identifying, based on matching the plurality of text, the object in the image.

3. The method of claim 2, wherein the plurality of text is a license plate number of a motor vehicle.

4. The method of claim 1, wherein identifying the object by performing recognition analysis of the image further comprises:

detecting, using object recognition software, a plurality of features of the object in the image; and identifying the object based on at least one of the plurality of features.

5. The method of claim 1, wherein processing the image comprises:

retrieving the GPS data from the image; and obtaining a plurality of geographic coordinates from the GPS data, wherein the processed GPS data comprises the plurality of geographic coordinates.

6. The method of claim 1, further comprising:

sending a request to a user to confirm that associating the object in the image with the asset in the financial application is correct; and receiving, in response to the request, confirmation that associating the object in the image with the asset in the financial application is correct.

7. The method of claim 1, further comprising:

before receiving the image of the object:
receiving an initial image of the object;
failing to process the initial image; and
sending a notification to a user that the initial image is insufficient to identify the object, wherein the notification comprises a request to the user to capture the image.

8. A system for associating an object in an image with an asset of a plurality of assets in a financial application, the system comprising:

a computer processor;

a storage repository associated with the financial application;

a global positioning system (GPS) data engine executing on the computer processor and configured to:
receive the image of the object comprising GPS data, wherein the image is captured using an image capture device with GPS functionality;
identify, using a geographic location of the object, the asset corresponding to the object by performing a recognition analysis of the image, wherein performing the recognition analysis comprises:
identifying a subset of the plurality of assets in the financial application located at the geographic location of the object, wherein the financial application stores a plurality of locations of the of the plurality of assets before the image is received;
associate, based on the recognition analysis, the object in the image with the asset of the plurality of assets of an owner in the financial application; and
store, in the storage repository associated with the financial application, the image of the object associated with the asset of the plurality of assets of the owner;

a GPS data reading module operatively connected to the GPS data engine and executing on the computer processor, the GPS data reading module configured to:
process the image with the GPS data to generate a processed GPS data; and a GPS mapping module operatively connected to the GPS data engine and executing on the computer processor, the GPS mapping module configured to:
determine, using the processed GPS data, the geographic location of the object in the image.

9. The system of claim 8, wherein the GPS data reading module is further configured to process the GPS data by:
retrieving the GPS data from the image; and
obtaining a plurality of geographic coordinates from the GPS data, wherein the processed GPS data comprises the plurality of geographic coordinates.

10. The system of claim 8, wherein the GPS data engine is further configured to:
send a request to a user to confirm that associating the object in the image with the asset in the financial application is correct; and
receive, in response to the request, confirmation that associating the object in the image with the asset in the financial application is correct.

11. The system of claim 8, wherein the GPS data engine is further configured to:
before receiving the image of the object:
receive an initial image of the object;
fail to process the initial image; and
send a notification to a user that the initial image is insufficient to identify the object, wherein the notification comprises a request to the user to capture the image.

12. The system of claim 8, further comprising:
an object recognition module operatively connected to the GPS data engine and executing on the computer processor, the object recognition module configured to:
detect, using object recognition software, a plurality of features of the object in the image;
identify, based on at least one of the plurality of features, the object to generate an identified object,
wherein the GPS data engine uses the identified object in the recognition analysis by:
comparing the plurality of features of the identified object with a plurality of descriptions of the subset of the plurality of assets at the geographic location;
matching one of the plurality of features to one of the plurality of descriptions in the financial application, wherein the one of the one of the plurality of descriptions is associated with the asset of the plurality of assets; and
identifying, based on matching the one of the plurality of features, the object in the image.

13. The system of claim 12, wherein one of the plurality of features of the object is detected using a data source to provide additional information not captured in the image.

14. The system of claim 8, further comprising:
a text recognition module operatively connected to the GPS data engine and executing on the computer processor, the plurality of text recognition module configured to:
obtain from the image, using character recognition software, a plurality of text; and
generate, from the plurality of text and using the character recognition software, a plurality of identified text,
wherein the GPS data engine uses the identified text in the recognition analysis by:
comparing the plurality of identified text to a plurality of descriptions, associated with the subset of the plurality of assets at the geographic location, in the financial application;
matching the plurality of identified text to one of the plurality of descriptions in the financial application, wherein the one of the plurality of descriptions is associated with the asset; and
identifying, based on matching the plurality of identified text, the object in the image.

15. The system of claim 8, further comprising:
a security module configured to authenticate communication with a user.

16. A non-transitory computer readable medium comprising computer readable program code embodied therein for performing a method for associating an object in an image with an asset of a plurality of assets in a financial application, the method comprising:
receiving the image of the object comprising global positioning system (GPS) data, wherein the image is captured using an image-taking device with GPS functionality;
processing the image to generate processed GPS data;
determining, using the processed GPS data, a geographic location of the object in the image;
identifying, using the geographic location of the object, the asset corresponding to the object by performing a recognition analysis of the image, wherein performing the recognition analysis comprises:
identifying a subset of the plurality of assets in the financial application located at the geographic location of the object, wherein the financial application stores a plurality of locations of the plurality of assets before the image is received;
associating, based on the recognition analysis, the object in the image with the asset of the plurality of assets of an owner in the financial application; and
storing, in the financial application, the image of the object associated with the asset of the plurality of assets of the owner.

17. The non-transitory computer readable medium of claim 16, wherein identifying the object by performing the recognition analysis of the image comprises:
obtaining from the image, using character recognition software, a plurality of text;
comparing the plurality of text to a plurality of descriptions associated with the subset of the plurality of assets located at the geographic location;
matching the plurality of text to one of the plurality of descriptions in the financial application, wherein the one of the plurality of descriptions is associated with the asset; and
identifying, based on matching the plurality of text, the object in the image.

18. The non-transitory computer readable medium of claim 16, wherein identifying the object by performing recognition analysis of the image comprises:
detecting, using object recognition software, a plurality of features of the object in the image; and
identifying the object based on at least one of the plurality of features.

19. The non-transitory computer readable medium of claim 16, wherein processing the image comprises:
retrieving the GPS data from the image; and
obtaining a plurality of geographic coordinates from the GPS data, wherein the processed GPS data comprises the plurality of geographic coordinates.

* * * * *